(12) United States Patent
Poorman

(10) Patent No.: US 8,191,304 B2
(45) Date of Patent: Jun. 5, 2012

(54) TURKEY DECOY

(76) Inventor: Yancy Z. Poorman, Bonne Terre, MO (US)

( * ) Notice: Subject to any disclaimer, the term of this patent is extended or adjusted under 35 U.S.C. 154(b) by 127 days.

(21) Appl. No.: 12/803,656

(22) Filed: Jul. 1, 2010

(65) Prior Publication Data

US 2011/0010982 A1    Jan. 20, 2011

Related U.S. Application Data

(60) Provisional application No. 61/271,216, filed on Jul. 18, 2009.

(51) Int. Cl.
*A01M 31/06* (2006.01)
(52) U.S. Cl. .............................................. 43/2
(58) Field of Classification Search .................. 43/2, 3
See application file for complete search history.

(56) References Cited

U.S. PATENT DOCUMENTS

| | | | | |
|---|---|---|---|---|
| 4,590,699 A * | 5/1986 | Nicks | | 43/2 |
| 4,965,953 A * | 10/1990 | McKinney | | 43/2 |
| 6,487,810 B1 * | 12/2002 | Loughman | | 43/2 |
| 6,775,943 B2 * | 8/2004 | Loughman | | 43/2 |
| 7,082,710 B1 * | 8/2006 | Jorgenson | | 43/2 |
| 7,231,727 B2 * | 6/2007 | Kang et al. | | 34/553 |
| 7,272,906 B1 * | 9/2007 | Spaulding, Sr. | | 43/3 |
| 7,730,656 B2 * | 6/2010 | Hulley | | 43/3 |
| 7,784,213 B1 * | 8/2010 | Primos | | 43/2 |
| 2003/0106253 A1 * | 6/2003 | Loughman | | 43/2 |
| 2007/0151139 A1 * | 7/2007 | O'Dell | | 43/2 |
| 2008/0209792 A1 * | 9/2008 | Watlov | | 43/2 |
| 2009/0107026 A1 * | 4/2009 | Wyant | | 43/2 |
| 2009/0249678 A1 * | 10/2009 | Arnold | | 43/2 |
| 2010/0115818 A1 * | 5/2010 | Rogers | | 43/2 |

* cited by examiner

*Primary Examiner* — Christopher P Ellis
(74) *Attorney, Agent, or Firm* — Paul M. Denk

(57) ABSTRACT

A decoy, fashioned to represent a male turkey, having a substructure constructed of tubular material, including a turkey head supported upright, an integrally extending lengthy support for holding the turkey body, and a downwardly depending tube, for impaling within the ground; and expandable turkey body made of flexible, nylon material printed to the image of a real life make turkey, expands into an open position around the body supporting portion of the tubular structure, to hold the body of the turkey in place.

7 Claims, 7 Drawing Sheets

TURKEY DECOY

CROSS REFERENCE TO RELATED APPLICATION

This non provisional patent application claims priority to the provisional patent application having Ser. No. 61/271,216, having filing date Jul. 18, 2009.

FIELD OF THE INVENTION

This invention relates to an animal decoy, for use during hunting, and is designed to be stored and conveyed in a collapsible configuration, but can be erected into a three dimensional fully supported turkey decoy that provides the appearance of a rooster under taking the mating display or structured position.

BACKGROUND OF THE INVENTION

This invention relates generally to the sport of hunting, more specifically to the hunting of the wild turkey, and to the representation of a male turkey in mating display termed "strutting", designed to attract other male turkeys through a visual, perceived challenger decoy, or life-like representation of another male turkey in mating display. It creates the illusion of a male turkey displaying mating actions, strutting, or attempting to attract females, which in turn attempts to draw the attention and prospective interaction of other male turkeys for the purpose of legal harvesting or photographing.

Obviously, multiple styles of decoys, more specifically turkey decoys, replicas, or artificial representations constructed of various materials, and found in various formations, formulations, postures, poses and designs have long been considered in previous art. Most of these types of innovations have been in the area of full bodied replications, representations, or decoys of the male turkey (gobbler) inclination, hoping to display the mating pose, position, or simulated actions or a male turkey in the "strutting" position, through use of plastics, foam, rubber, and other material that attempt to duplicate the representation of a male turkey's body and spread tail (fan), in order to attempt to draw the attention and hopeful interaction of a live animal for the purpose of harvesting or photographing, and these have all been considered in the prior art. In addition, various accessories and modifications have been offered for decoys, such as various head positions, attempt to hold the body portion expanded through operable components, stakes, springs, and other devices to keep them in full form, and component designs to allow disassembly for ease of transport, packing, and/or storage, have all been considered in prior art.

The current invention seeks to further modify the design of a three dimensional, full bodied, turkey decoy or replication, in order to allow it to be folded flat, for a more easy and safe decoy or replication, in and to allow it to be folded for easy transport, simplify the assembly process, enhance the realism, reduce the number components, and substantially differentiate itself from the design of any current application.

SUMMARY OF THE INVENTION

This invention primarily relates to a turkey decoy, and more specifically to one that can be unfolded from a collapsed position and supported by tubular frame to provide a decoy furnishing the appearance of a gobbler, or even a hen or fake, in a mating display or strutting position.

This invention contemplates the formation of a structural support, formed of tubular components, which when integrated together provides a generally longitudinal support of tubular components that can be interfitted together, the frontal part of the tubular support having an upright member, that affords support for the head of the turkey, while approximately at the middle of the horizontal support a downwardly extending portion that connects with a spike or other member that can embed in the ground, to hold the turkey decoy in its upright displayed position, particularly during hunting.

The body of the turkey is formed of an expandable nylon material, so that it is reasonably weather proof, and formed of an integrated configuration wherein every component of the body is expandable, as it is unfolded in a circular array, to form a three-dimensional body part of the turkey, as noted. And, both the head and the body part of the turkey are imprinted or colored into the appearance of a male turkey, or gobbler, so that from a distance, it has a very representative three dimensional image of a gobbler in its mating display, or in its strutting position, so as to act as an allure to other hens, and thus other gobblers, in usage and application.

The complete assembled decoy has all the appearances of an authentic bird, and even has a length of natural beard appended to the head and neck of the turkey, as it is applied to the upright support, during its assembly.

The entire configuration for the decoy can be assembled in the manner of minutes, from an array of integrated minimal parts, so that it can be assembled and installed in a brief period of time, even in the dark, as when the turkey hunter frequently assembles his decoy, at the location where he would hunt, near the roost, so that at sunrise, he is fully ready with a displayed decoy erected to attract any surrounding birds, as they arise for a days feeding.

The purpose of this invention is to provide a decoy that is relatively inexpensive of cost, contains few parts, can be quickly assembled in a minimum of time, but yet exhibits sufficient authenticity so as to make the decoy rather attractive, when used for hunting purposes.

It is, therefore, the principal object of this invention to provide a turkey decoy that furnishes a replica of the body and other parts of a turkey, exhibits life-like feathers, and which can be readily applied and supported upon the ground.

Another object of this invention of is to provide a decoy with a definitive representation of the body of a wild male turkey.

Yet another object of this invention is to provide a decoy that is collapsible, into a smaller configuration, can easily fit and be stored within a conveying bag, but yet can be promptly removed, expanded, and supported upon a tubular support, when readied as a attractant during hunting.

Still another object of this invention is to provide a turkey decoy that is made generally of waterproof components that can withstand the rigors of adverse weather conditions, when used during turkey hunting.

These and other objects may become more apparent to those skilled in the art upon reviewing the summary of the invention as provided herein, and upon undertaken a study of the description of its preferred embodiment, in view of the drawings.

DESCRIPTION OF THE PREFERRED EMBODIMENT

Figure 1:
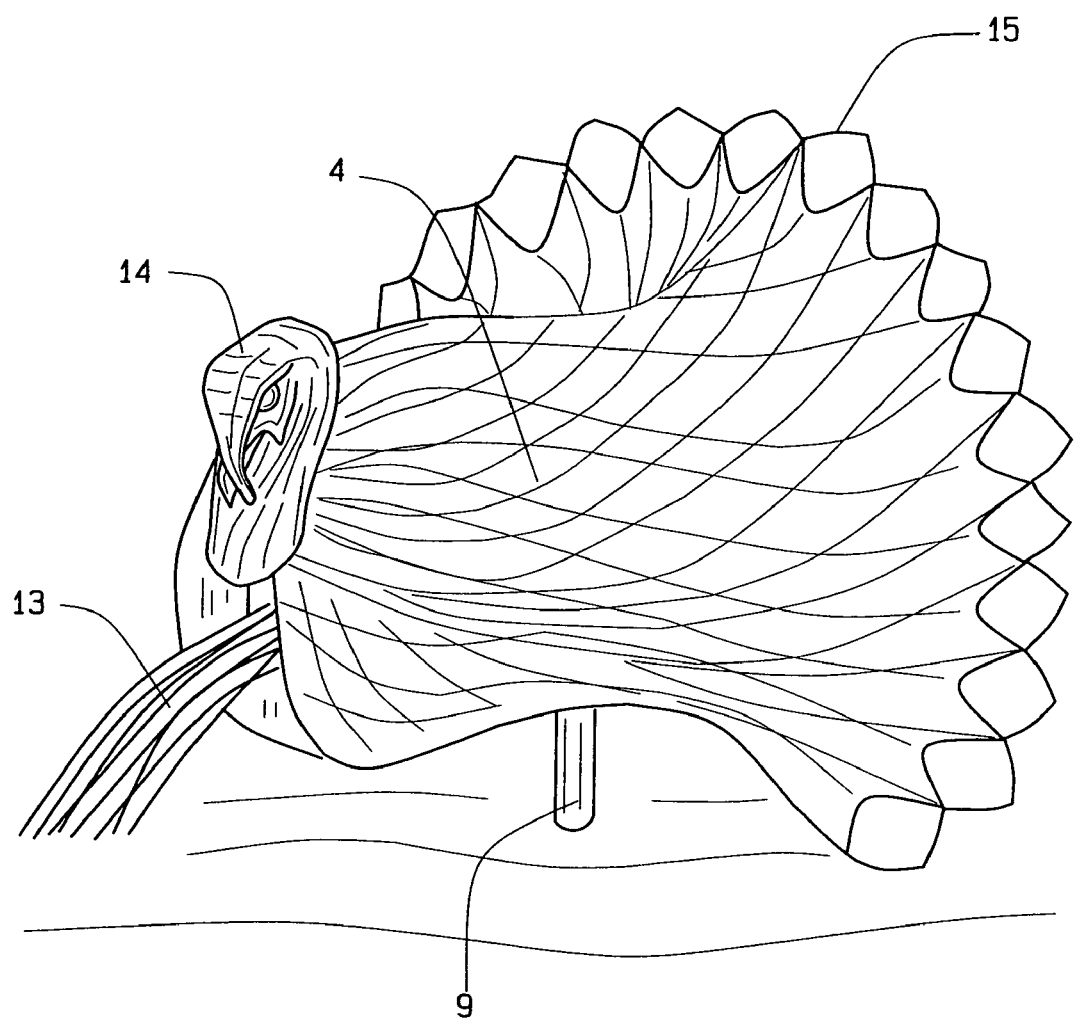
FIG. 1 shows the entire turkey decoy fully assembled and installed to function in that manner during hunting.

In referring to the drawings and the displays of the turkey decoy of this invention, a decoy, is fashioned to represent a male turkey, or gobbler. In the three-dimensional, as shown as the rounded body is comparable in length to a turkey of mature size and pose as a male in mating display with tail section fanned out. The expanded body is composed of a thin, flexible, nylon material that is folded and glued in a pattern so as to form a baffle, allowing the unit to be expanded, from flat to fully opened and three dimensional in size. This expanded body is held open by a draw cord, and/or assisted by magnets which can be embedded in the plastic side panels. While fully expanded, the body form is placed over a cylindrical plastic rod, which will lie in the axis of the fold that is created by expanding the unit to its full dimensions, resting thereupon for support while fully expanded. This supporting rod, center support arm, and stabilizing point, is in two parts and connected by a "tee connector", followed by the second section, of approximately ⅔ (15") of the total length, and also attached to the "tee connector" junction. At one end of the plastic, center supporting rod, it is fully connected through the "tee connector" at a 90 degree elbow, allowing a 4" section of rod to be connected upright to the main center supporting rod, forming a single unit when completely assembled with a total horizontal length of 24 inches, and a 4 inch vertical extension at the front end. Over the 4 inch vertical extension a plastic molded head piece is mounted, by being hollow and having the vertical extension inserted from the bottom to hold it in an upright position while the decoy is fully assembled, as attached and extending from the 90 degree elbow section, so as to be visible while fully assembled, and included is a bundle of fiber, string, or cord assembled to replicate the hair-like beard of a male turkey, visible when in the mating display normally termed "strutting". The entire assembled decoy unit will be erected in a standing position by a ground stake, of approximately 18 inches, preferably composed of cylindrical plastic, forming a rod with one pointed end for insertion into the ground and one flat end, of slightly smaller diameter than the insertion aperture of the receiving "tee connector", allowing the fully assembled unit to spin, sway, twist, and rotate freely when acted upon by an outside force such as the wind or air touch.

In referring to FIG. 1, therein is shown the fully assembled turkey decoy which discloses its body portion, having the molded head section 14 applied thereto, and with the beard 13 of the turkey extending forwardly, and the body portion being expanded into its fantailed configuration, as noted at 15. The entire unit is supported by a stake 9, into the ground.

Figure 4:
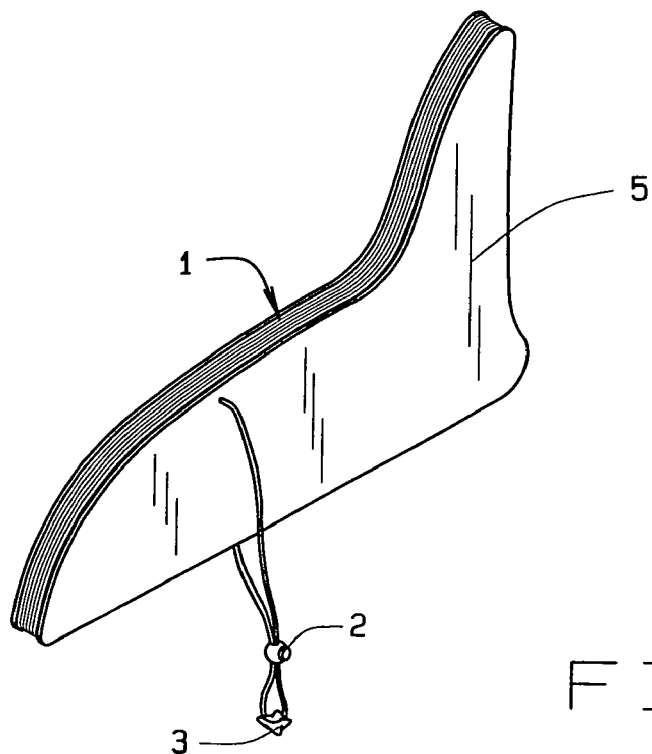
FIG. 4 shows an oblique view of the collapsed turkey body decoy of the invention, before its assembly.
Figure 5:
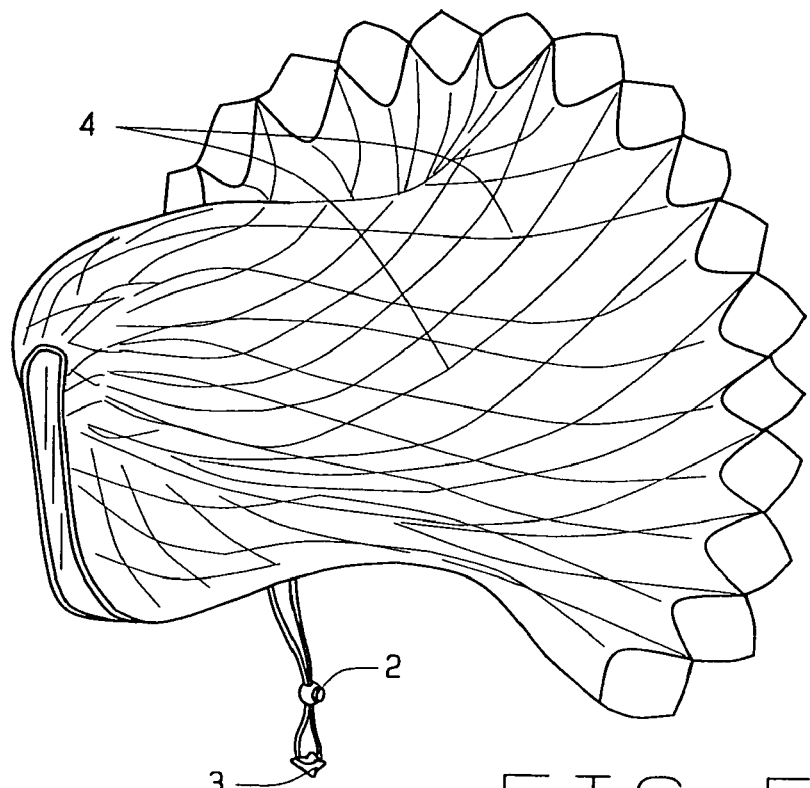
FIG. 5 shows the turkey body unfolded and to its full configuration during assembly in preparation for its application to its support rod in preparation for hunting.

In referring to FIG. 4, therein is shown the side view of the collapsed turkey body 1 which is held by its drawstring and slide stop 2, the string having a knot 3 at its lower end, to keep the slide stop from being removed. Essentially, as shown, this provides a full view of the collapsed turkey body, as formed from the thin, flexible, nylon material, which can be expanded, in accordion fashion, when it is opened and circularly expanded to form the three-dimensional body for the turkey, as can be noted in FIG. 5. These diamond shaped formed flexible and nylon material, as at 4, can generally be expanded into a configuration as shown in FIG. 5, but when the body portion of the turkey is collapsed, these diamond portions fold upon one another, into a flattened configuration, generally having the shape as noted in FIG. 4. The body portion has a polymer sized panel, generally as noted at 5, and there is one on each open face of the body part, so that when it is pivoted into an opened and three-dimensional configuration, the plastic side panels come into approximate contiguity, and these are locked together and held into position, contiguously, by means of said draw string 2.

Figure 6:
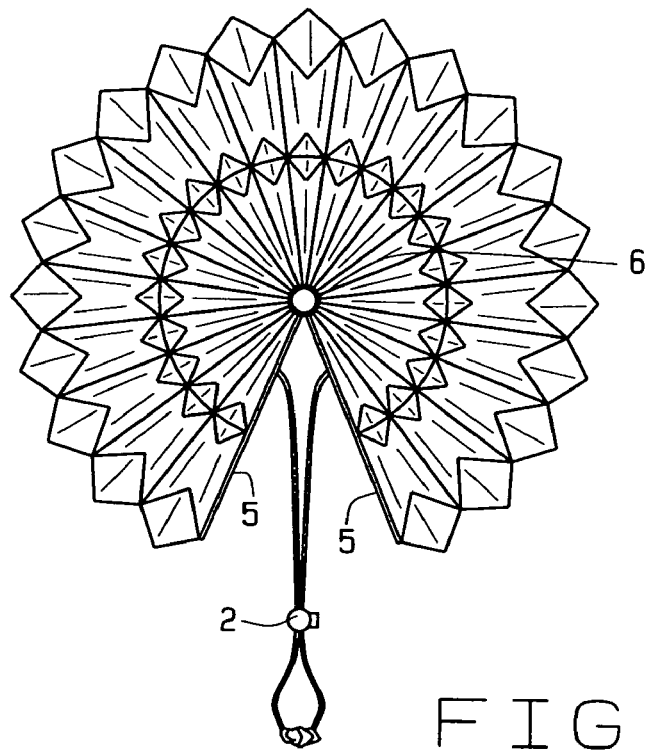
FIG. 6 shows a front view of the turkey body in the process of being expanded, having its drawstring that holds the leading surfaces of the expandable body into their expanded state.
Figure 7:
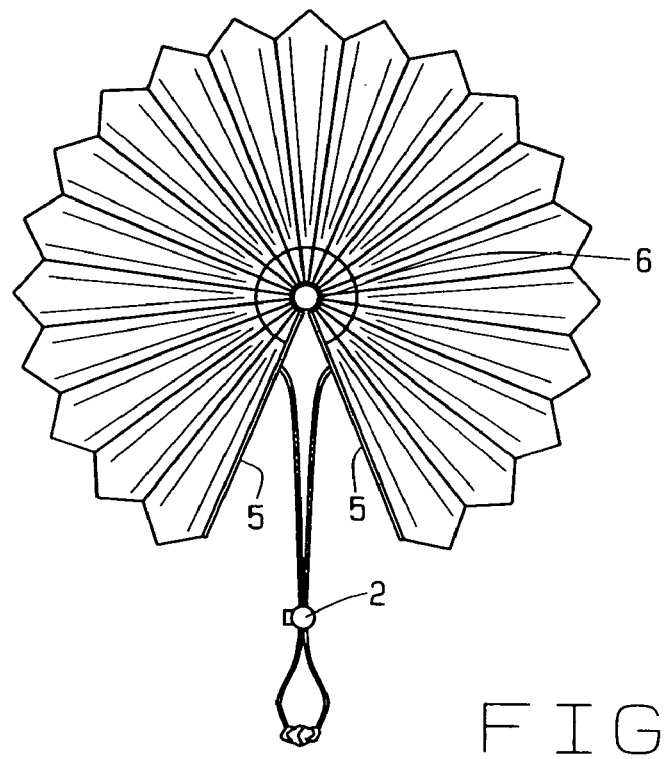
FIG. 7 provides a rear view of FIG. 6.

FIG. 6 provides a view of the expanding body portion, and it can be seen how the panels 5 are entering into position, adjacent each other, so as to complete the entire expanded body part once assembled. It can also be seen how the horizontal supporting rod or tube, as noted at 6, will be centered within the body part, as it has been opened, pivoting around the rod 6, and then held into position by the tighten drawstring 2, when fully assembled. FIG. 7 provides a rear view of the expanded body part of the decoy.

Figure 2:
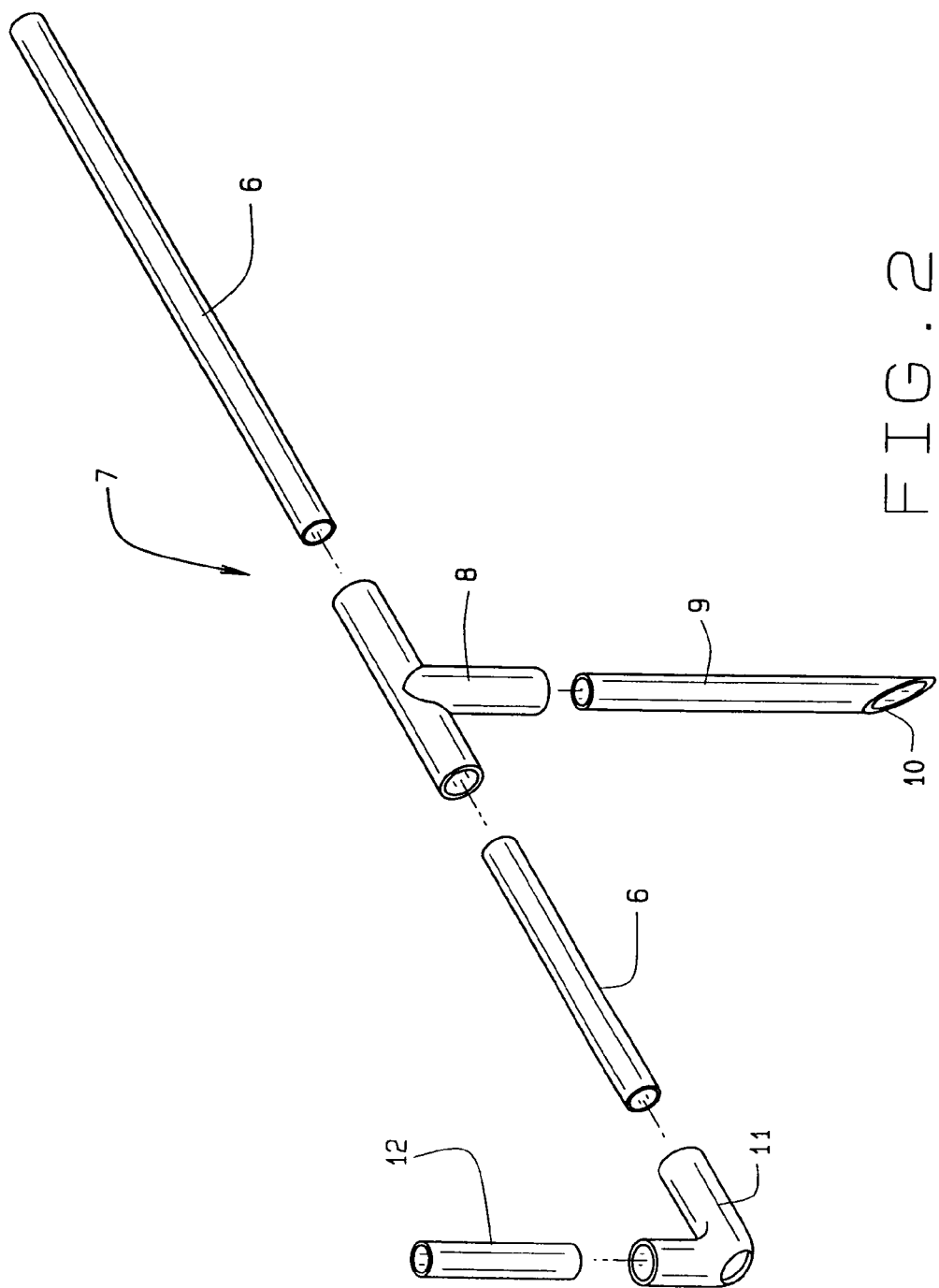
FIG. 2 shows the tubular support structure in exploded view as it is being connected together to form the support for the turkey body and head of the decoy.

FIG. 2 shows the tubular rod or support for the invention. The support 7 includes a series of interconnected segments 6, as previously reviewed, and these segments are held together by means of a Tee connector 8 as noted. An anchor or stake 9 connects to the downward component of the connector 8, and since the stake has a pointed lower end 10 it can be impaled, under pressure, into the ground. The tee may be loosely fitted into the stake, so the entire decoy can swivel with the force of any wind.

The frontal segment 6 connects with an elbow 11 and an upright tubular member 12 connects with the upper end of the elbow, and provides for the support of the head of the turkey, when assembled thereon. The various segments and the uprights can be either telescopically connected together or secured by any other supporting peg, or the like, when the entire tubular support is assembled and erected for mounting of the turkey decoy components thereon.

Figure 3:
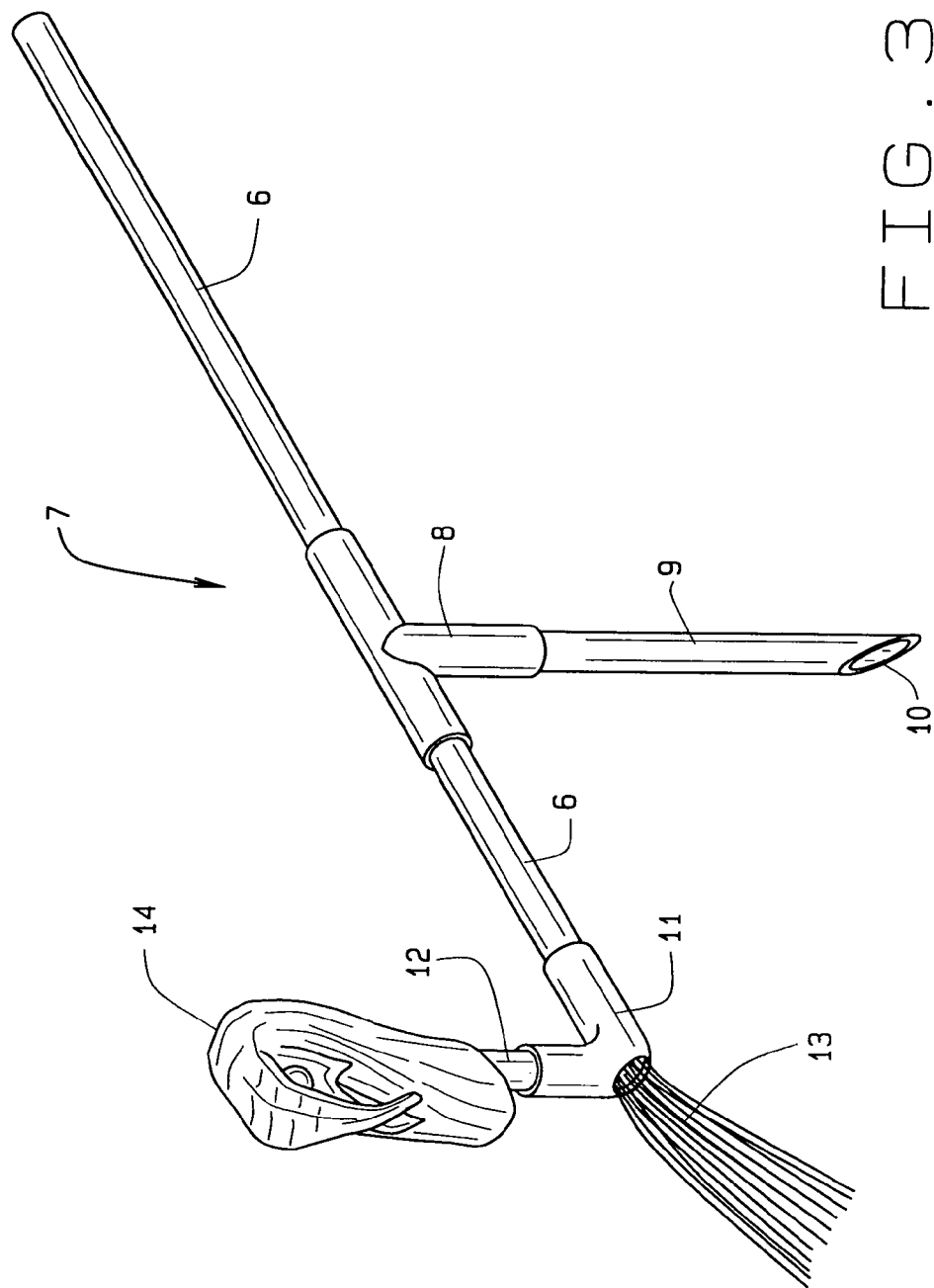
FIG. 3 shows the application of the turkey head to the upright rod of the support.

FIG. 3 shows the entire tubular support, fully assembled, with the stake ready for connection with the lower tee 8, when readied for impalement within the ground. As can be seen, the elbow 11 has connecting means, or an aperture, provided at its outer part of the 90 degree elbow, and to this or through it a bundle of nylon yarn, or an actual beard, as at 13, connects, and gives the rather authentic appearance of a gobbler beard, projecting angular downwardly, producing an authentic representation of a gobbler in display.

FIG. 3 shows the application of a molded head 14, which may be formed of polymer, or the like, that is slid over the upright 12 during its assembly.

Figure 8:
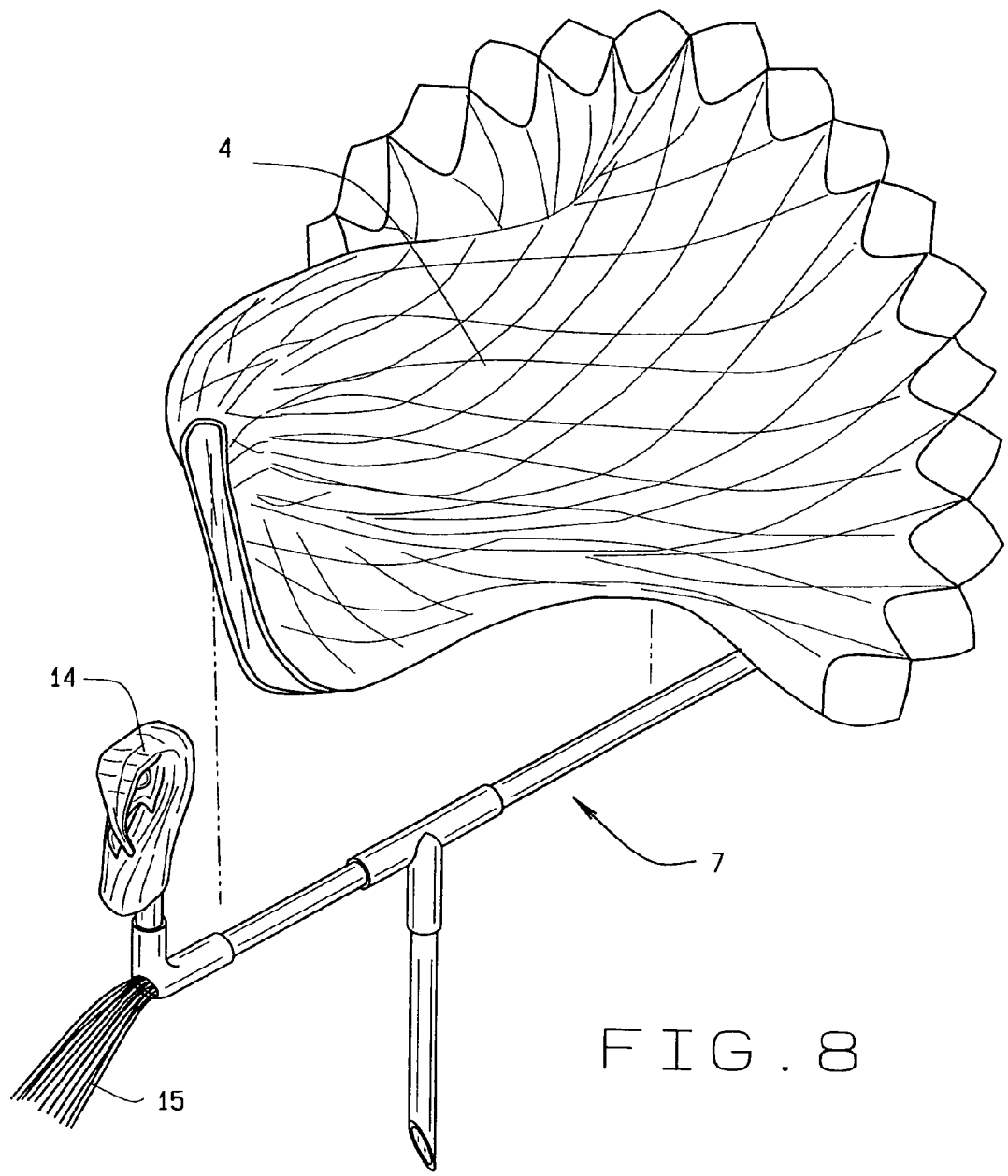
FIG. 8 shows the turkey body in preparation for its application to the support rod, while the turkey head and beard have already been installed.

FIG. 3 also shows a view of the tubular support for impalement within the ground with a horizontal segment ready for acceptance of the body part of the turkey, after its head and beard have been applied. FIG. 8 shows the application of the body part as being expanded in a circular pivot to surround the tubular support 6, when the final assembly of the turkey is being performed.

Once again FIG. 1 shows the complete configuration of the fully assembled turkey decoy, applied to the ground. It is also to be noted that as the body part has been assembled around that support 6, that it does not necessarily fully surround in complete circular configuration the segmented tube 6, but rather, it may be slightly displaced, as shown in FIG. 6, so that it gives the appearance of downwardly extending wings, as can be seen at 15, to make it appear as if the turkey's two wings are extending downwardly, as it does in its mating strut.

The entire assembled decoy is shown in FIG. 1, and from a distance, provides a very authentic appearing decoy for a gobbler, as previously reviewed, in either its mating display, or when strutting.

Figure 9:
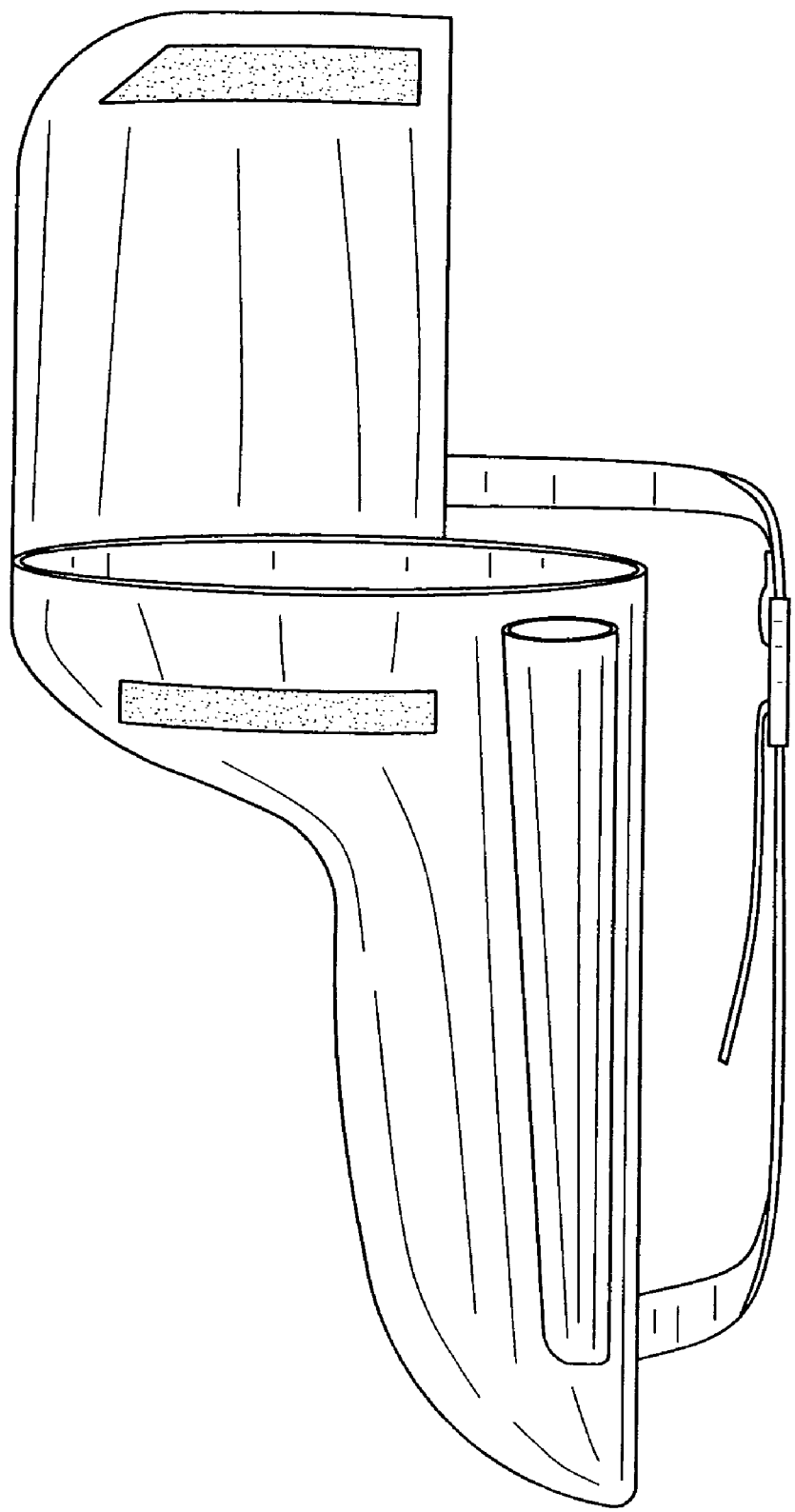
FIG. 9 discloses the carrying case for the disassembled components of the turkey decoy.

The entire decoy, when disassembled, and all of its segmented tubes separated, can be applied into a supporting case or pouch 16 as noted in FIG. 9, for storage, or for ease of conveyance. A support strap or carrying handle 17 facilitates its holding. A cover flap 18 may be turned over the open end, and held by Velcro, or other connector, in place, to add closure, and to prevent any of the components from slipping out of the supporting pouch.

Variations or modifications to the subject matter of this invention may occur to those skilled in the art upon reviewing the development as described herein. Such variations are intended to be encompassed within the scope of any claims to invention that may issue upon this development. The description of the preferred embodiment, as depicted in the drawings, is set forth for illustrative purposes only.

The invention claimed is:

1. A turkey decoy furnishing a representation and replica of the body of a turkey, particular a gobbler, to act as an attractant while hunting or for other purposes, said turkey decoy including a support means, comprised of a series of segmented tubes, which when connected together form the horizontal support for the decoy, a downwardly extending stake, connected with the segmented tubes, and useful for impaling the support into the grounds; an upright support formed of tubular member provided at the front end of the horizontal tubular support, and therein functioning to hold the head and the beard of the decoy in place during its assembly;

a body like component for the decoy, formed of an expanded nylon material, representative of the body and wings of a turkey, unfolded by pivoting in a circular configuration about the horizontal tubular support, to form the body like portion for the decoy, and wherein when the body like portion is removed, and pivoted into its contracted state, facilitates its storage.

2. The turkey decoy of claim 1 wherein the body like component is formed of expanded nylon material, and a pair of plastic panels applied to each side edge of the expanded body, such that when the body part is expanded, the panels enter into proximity, and are held by a drawstring once positioned upon the tubular support.

3. The turkey decoy of claim 2 and further including magnets, one applied to each of the panels, and furnished for holding the panel parts of the expanded body of the turkey into proximity when expanded and assembled during usage.

4. The turkey decoy of claim 1 wherein the tubular support for the body portion of the turkey decoy includes a pair of tubular segments, a tee connector interconnecting between the pair of tubular segments, and the downwardly extending stake, and an elbow formed at the front of the tubular segments providing support for the vertical tube, for securement of the turkey decoy head and beard into position during usage.

5. The turkey decoy of claim 4 wherein the beard extends through an aperture provided within the elbow of the tubular support.

6. The turkey decoy of claim 5 wherein the turkey body panels when expanded circularly into its three-dimensional configuration representative of the body of a turkey form downwardly depending wings for the integrated turkey during its usage when assembled as a decoy.

7. The turkey decoy of claim 4 wherein a carrying case provided for holding the support means, the turkey body, the turkey head and beard, the elbow and tee, and the stake when the turkey decoy is disassembled for conveyance and storage.

* * * * *